(12) United States Patent
Reidlinger et al.

(10) Patent No.: US 7,479,526 B2
(45) Date of Patent: Jan. 20, 2009

(54) HYDROXY-FUNCTIONAL BINDER COMPONENTS

(75) Inventors: Gerhard Reidlinger, Graz (AT); Johann Billiani, Graz (AT); Ewald Zrin, Graz (AT); Johannes Scherz, Wundschuh (AT)

(73) Assignee: Cytec Surface Specialties Austria GmbH (AT)

( * ) Notice: Subject to any disclaimer, the term of this patent is extended or adjusted under 35 U.S.C. 154(b) by 366 days.

(21) Appl. No.: 10/565,028

(22) PCT Filed: Jul. 13, 2004

(86) PCT No.: PCT/EP2004/007718

§ 371 (c)(1),
(2), (4) Date: Jan. 18, 2006

(87) PCT Pub. No.: WO2005/012370

PCT Pub. Date: Feb. 10, 2005

(65) Prior Publication Data

US 2006/0194922 A1 Aug. 31, 2006

(30) Foreign Application Priority Data

Jul. 23, 2003 (AT) .............................. A 1160/2003

(51) Int. Cl.
C08F 8/30 (2006.01)

(52) U.S. Cl. ........................ 525/127; 528/315; 528/322; 528/272

(58) Field of Classification Search ................. 525/127, 525/240, 301; 528/172, 310, 44, 342, 45, 528/272, 315, 322; 430/270.1; 428/423.1
See application file for complete search history.

(56) References Cited

U.S. PATENT DOCUMENTS 5,886,194 A 3/1999 Ulmer et al.
2004/0197702 A1* 10/2004 Shirakawa et al. ....... 430/270.1

FOREIGN PATENT DOCUMENTS

GB 1 591 321 6/1981

* cited by examiner

Primary Examiner—Irina S Zemel
Assistant Examiner—Frances Tischler
(74) Attorney, Agent, or Firm—Connolly Bove Lodge & Hutz LLP

(57) ABSTRACT

The invention relates to hydroxyl-functional binder components ABC containing a linear or branched main chain having a polymethylene structure —$(CH_2)_n$— or a polyester structure or a structure derived from the fatty acid esters of glycerin or other polyvalent alcohols. The invention is characterized in that said components have grafted cyclic imide structures on the main chain, wherein the imide-nitrogen atom is substituted by a hydroxyalkyl group or a hydroxyalkyl-aryl group. The invention also relates to method for the production of said components by reacting oleofinically unsaturated acid anhydrides B and hydroxyamines C and to the utilization of the inventive components for the formulation of binders.

11 Claims, No Drawings

HYDROXY-FUNCTIONAL BINDER COMPONENTS

This application is a national stage application (under 35 U.S.C. 371) of PCT/EP2004/007718 filed Jul. 13, 2004 which claims benefit to Austrian application A 1160/2003 filed Jul. 23, 2003.

FIELD OF THE INVENTION

The invention relates to hydroxy-functional binder components. It also relates to a process for the preparation of these binder components and to the binders prepared therewith and their use, in particular for formulation of glazes for wood and wood materials.

BACKGROUND OF THE INVENTION

It has been known to prepare adducts by reaction of maleic anhydride with water-insoluble resins and oils which contain olefinic double bonds in a preferably isolated, that is to say non-conjugated, arrangement, the acid anhydride function being retained. By reaction with hydroxy-functional products, these adducts can give half-esters, with ring opening and formation of one acid group per molecule of maleic anhydride added. These carboxy-functional half-esters can be emulsified in water after at least partial neutralisation of the acid groups; binders can be formulated with these emulsions. However, the storage stability and the drying properties of paints, impregnating agents and glazes for wood and wood materials based on these binders are unsatisfactory. For this reason, these emulsions are not used as the sole binder in combination with suitable curing agents, but must be mixed with other water-dilutable binders.

Such mixtures, however, have an inadequate storage stability. There is a need, therefore, to create products from the adducts mentioned that can be formulated by reaction with suitable reaction partners to sole binders for storage-stable and fast-drying paints and glazes. In this context, hydroxyl groups are preferred as the functional groups.

SUMMARY OF THE INVENTION

The invention therefore relates to hydroxy-functional binder components ABC obtainable by reaction of olefinically unsaturated compounds A having at least one olefinic double bond and a molar mass of from 400 g/mol to 6,000 g/mol, preferably from 500 g/mol to 5,000 g/mol, selected from the group consisting of oils, partly saponified or partly transesterified oil, alkyd resins of low molar mass, and oligomers or polymers of diolefins, olefinically unsaturated cyclic acid anhydrides B, and hydroxyamines C having at least one primary amino group and at least one hydroxyl group, wherein the radicals of the acid anhydrides B are bonded to the compounds A by a carbon-carbon bond, and wherein the acid anhydride groups are converted into acid imide groups by reaction with the hydroxyamines C. The reaction products ABC therefore contain a linear or branched main chain which has a polymethylene structure —$(CH_2)_n$— or a polyester structure or a structure derived from fatty acid esters of glycerol or other polyhydric alcohols, and, grafted onto this, cyclic imide structures, the imide nitrogen atom being substituted by a hydroxyalkyl group or a hydroxyalkyl-aryl group.

DETAILED DESCRIPTION OF THE PREFERRED EMBODIMENTS

The olefinically unsaturated compounds A contain at least one, preferably two or more olefinic double bonds, the olefinic double bonds preferably being in isolated, in particular non-conjugated arrangement. They are preferably selected from the group consisting of oils, partially saponified oils or partially transesterified oils, these oils having an iodine number of preferably from 100 cg/g to 220 cg/g, particularly preferably from 120 cg/g to 210 cg/g. "Partially saponified" is understood here as meaning oils which contain at least one free hydroxyl group by saponification. "Partially transesterified" is understood as meaning oils which contain free hydroxyl groups by reaction with di- or polyhydric alcohols under transesterification conditions.

Suitable olefinically unsaturated cyclic acid anhydrides B are intramolecular anhydrides of aliphatic and cycloaliphatic dicarboxylic acids having from 4 to 16 carbon atoms and at least one olefinic double bond, in particular maleic anhydride and tetrahydrophthalic anhydride.

Suitable hydroxyamines C are aliphatic linear, branched or cyclic hydroxyamines having at least one hydroxyl group and at least one primary amino group and at least two carbon atoms. Suitable compounds are, for example, ethanolamine, 3-aminopropanol, 3- and 4-aminobutanol, 5-aminopentanol, 6-aminohexanol, 4-hydroxycyclohexylamine, 1-amino-4-(2-hydroxyethyl)piperazine, aromatic-aliphatic hydroxyamines, in which at least one amino group is bonded to an aromatic or aliphatic carbon atom and at least one hydroxyl group is bonded to an aliphatic carbon atom, such as o- and m-aminobenzyl alcohol, and dihydroxyalkylamines, such as N,N-bis(2-hydroxyethyl)-ethylenediamine.

Adducts ABC which are particularly preferred are reaction products of oils, in particular linseed oil, soy bean oil and tall oil, alkyd resins of low molar mass derived from oils and fatty oils by transesterification with polyhydric alcohols, such as glycerol, trimethylolpropane and pentaerythritol or with polybasic acids or anhydrides thereof, such as phthalic acid (anhydride), and homopolymers of butadiene or isoprene or copolymers thereof with ethylene, propylene or 1-butene, with maleic anhydride or tetrahydrophthalic anhydride or mixtures thereof, and ethanolamine.

The adducts ABC containing hydroxyl groups can be reacted by a large number of further reactions to give binders for coating compositions. In this context, the hydroxyl groups are reacted either with low molar mass or high molar mass compounds D′ containing acid groups in an esterification reaction or with low molar mass compounds D″ containing isocyanate groups in an addition reaction.

Suitable reaction partners D′ containing acid groups are selected from the group consisting of polybasic acids D1 having at least two acid groups, fatty acids D2 grafted with olefinically unsaturated acids, oils D3 grafted with olefinically unsaturated acids, and polymers D4, containing acid groups, of olefinically unsaturated monomers.

Suitable reaction partners D″ containing isocyanate groups are chosen from reaction products D5 of polyfunctional isocyanates with compounds which contain at least one group which is reactive towards isocyanates and at least one acid group, and adducts D6 of polyfunctional isocyanates with olefinically unsaturated compounds containing hydroxyl groups.

Suitable polybasic acids D1 are aliphatic or aromatic compounds having at least one carboxyl group and at least one further acid group chosen from carboxyl groups, sulfur-containing acid groups, in particular sulfonic acid groups —$SO_3H$ and sulfinic acid groups —$SO_2H$, and phosphorus-containing acid groups chosen from phosphonic acid groups —$PO_3H_2$, phosphonous acid groups —$PO_2H_2$ and phosphinic acid groups —$POH_2$. It is also possible to use, instead of the free acids, their anhydrides. Trimellitic acid and its anhydride as well as sulfoisophthalic acid are particularly suitable.

Suitable grafted fatty acids D2 are obtained from fatty acids D21 having from 12 to 30 carbon atoms, which contain at least one olefinic double bond, and olefinically unsaturated acids D22 having from 3 to 8 carbon atoms, which contain at least one carboxyl group and at least one olefinic double bond. Suitable fatty acids D21 are linoleic acid, linolenic acid, oleic acid and palmitoleic acid. Suitable low molar mass unsaturated acids are acrylic acid, methacrylic acid, vinylacetic acid, maleic acid, tetrahydrophthalic acid and itaconic acid. In the grafting reaction, further olefinically unsaturated copolymerisable monomers D23 may also be used, in a mixture with the said acids D22, such as, for example, styrene, p-methylstyrene, methyl (meth)acrylate, ethyl (meth)acrylate, isobutyl (meth)acrylate and 2-ethylhexyl (meth)acrylate.

Suitable grafted oils D3 are such oils D31 which are grafted with acids D22 and optionally, the further monomers D23, which oils D31 contain at least one olefinic double bond in the molecule. Suitable oils D31 are, in particular, wood oil, soya oil and linseed oil having iodine numbers of from 100 cg/g to 220 cg/g, preferably of from 120 cg/g to 210 cg/g.

Suitable acid copolymers D4 are copolymers of acids D22, in particular of acrylic and methacrylic acid, with copolymerisable monomers selected from the group consisting of alkyl esters of acids D22, in particular methyl (meth)acrylate, ethyl (meth)acrylate, propyl (meth)acrylate, the isomeric butyl (meth)acrylates and 2-ethylhexyl (meth)acrylate, hydroxyalkyl esters of acids D22, in particular hydroxyethyl (meth)acrylate, hydroxypropyl (meth)acrylate and hydroxybutyl (meth)acrylate, styrene, vinyltoluene, and p-methylstyrene. Copolymers of (meth)acrylic acid, methyl (meth)acrylate, (iso-)butyl (meth)acrylate, 2-ethylhexyl (meth)acrylate, hydroxyethyl (meth)acrylate and (p-methyl-)styrene are particularly preferred.

Suitable adducts D5 of isocyanates with compounds which contain an acid function and at least one group which is reactive towards isocyanates are hydroxy acids D51 as well as amino acids D52 and mercapto acids D53 with at least difunctional isocyanates D54, in particular diisocyanates, which are aromatic or aliphatic and are chosen, in particular, from toluylene-diisocyanate, tetramethylxylylene-diisocyanate, bis(4-isocyanatophenyl)methane, hexamethylene-diisocyanate, isophorone-diisocyanate, trimethylhexane-diisocyanate and the allophanates, isocyanurates, biurets and uretdiones derived from these isocyanates. The hydroxy, amino and mercapto acids preferably contain sterically hindered acid groups, that is to say those which do not react or react only slowly with isocyanates under decomposition and evolution of carbon dioxide.

Suitable adducts D6 are reaction products of polyfunctional isocyanates D61 with olefinically unsaturated monomers which contain groups that are reactive towards isocyanates, such as hydroxyl groups, mercaptan groups or amino groups. Suitable compounds are, in particular, hydroxyalkyl esters of the acids mentioned under D22, such as hydroxyethyl and hydroxypropyl (meth)acrylate.

The reaction with low molar mass acids D' is carried out under condensation conditions and with enlargement of the molecule, a polyester being formed from adducts ABC having at least two hydroxyl groups and low molar mass acids D' having likewise at least two acid groups. In this context, the amounts of the educts D' and ABC are to be chosen so that an excess of acids D' is employed, as a result of which condensation products having an acid number of from approximately 10 mg/g to approximately 100 mg/g, preferably from 20 mg/g to 80 mg/g, are prepared.

In the reaction of high molar mass compounds D' containing acid groups and having acid numbers of from 10 mg/g to 50 mg/g, only a low decrease in the acid number is observed during the condensation. Still, whereas a sample of the still unreacted reaction mixture comprising the adduct ABC and the high molar mass compound D' containing acid groups does not yield a homogeneous mixture on dilution in 10 times the mass of water, after condensation for approximately 8 hours, the reaction mixture becomes water-dilutable, and in the condensed reaction mixture diluted with water no phase separation is observed even after being left to stand for 24 hours at room temperature (23° C.).

By reaction with the compounds D5 containing isocyanate groups and acid groups, products are formed which contain acid groups instead of the hydroxyl groups and which are suitable in particular as additives to other water-dilutable binders to increase the mass fraction of solids thereof. In the reaction with compounds D5 that contain two isocyanate groups and one acid group, such as, for example, the reaction products of dimethylolpropionic acid or dimethylolacetic acid with preferably aliphatic diisocyanates or reaction products of monohydroxy acids with triisocyanates, such as the isocyanurates of the abovementioned diisocyanates, reaction products are obtained which contain two radicals of the adducts ABC and one acid group and which can already be employed as sole binders or as resin for admixing to other binders.

Finally, the reaction of the adducts ABC with the reaction products D6 of diisocyanates and hydroxyalkyl esters of olefinically unsaturated acids leads to substances which can be employed as binders in radiation-curable coating compositions and which are distinguished by a low viscosity and high reactivity.

The invention is illustrated by the following examples.

EXAMPLES

Example 1

Resin 1 Containing Acid Groups 700 g of tall oil fatty acid, 92 g of glycerol and 0.8 g of triphenyl phosphite were charged into a reactor and heated to 230° C. The water of reaction was distilled off azeotropically by addition of 25 g of xylene, and the xylene separated from the water was recycled. Esterification was carried out at this temperature for approximately five hours with removal of water, until the acid number of the reaction mixture had fallen to less than 2 mg/g.

After addition of 30 g of phthalic anhydride, esterification was continued for three more hours to an acid number of less than 6 mg/g, with the water of reaction being separated. The xylene was then removed by distillation under reduced pressure.

A liquid resin having the following data was obtained:

| | |
|---|---|
| mass fraction of solids: | 99.2% |
| acid number: | 4.7 mg/g |
| dynamic viscosity (23° C., 100 s$^{-1}$): | 128 mPa · s |

Example 2

Oil Grafted with Maleic Acid 500 g of soybean oil and 100 g of maleic anhydride were charged into a reactor and the reactor was freed from atmospheric oxygen by successive cycles of evacuation and filling with inert gas. The mixture was heated up to 140° C. under an inert gas blanket and the temperature was then increased to 210° C. in the course of two further hours. The reaction mixture was kept at this temperature for approximately three hours until the adduct formation was concluded. Free maleic anhydride could no longer be detected. A liquid resin having the following data was obtained:

| | |
|---|---|
| mass fraction of solids: | 99.1% |
| Acid number: | 92.2 mg/g |
| | (determined as the half-ester) |
| Dynamic viscosity (23° C., 25 s$^{-1}$): | 4,750 mPa · s |

Example 3

Fatty Acid Grafted with (acid) Vinyl Monomers 71 g of linseed oil fatty acid were introduced into a reactor and heated to 140° C. A mixture comprising the monomers isobutyl methacrylate (55 g), p-methylstyrene (10 g) and methacrylic acid (35 g) was uniformly added dropwise in the course of approximately 7.5 hours, and at the same time 4 g of di-tert.-butyl peroxide were added. When the addition had ended, the reaction mixture was stirred further at 140° C. until a conversion of more than 95% resulted from the mass fraction of solids measured. In a repeat experiment, it was possible to accelerate the reaction by addition of further peroxide. By applying a reduced pressure (approximately 100 hPa=100 mbar) at the reaction temperature, it was possible to virtually quantitatively remove the residual monomers in the course of approximately 20 minutes. The cooled reaction mixture was diluted with xylene. A resin solution with the following data resulted:

| | |
|---|---|
| mass fraction of solids: | 85% |
| Acid number: | 200 mg/g |

Example 4

Adduct from Example 2 Reacted with Hydroxyamine 600 g of the resin from Example 2 and 165 g of xylene were charged into a reactor. 61 g of ethanolamine were added in the course of ten minutes under stirring, and the temperature rose to approximately 85° C. due to the exothermic reaction. After the exothermicity had subsided, the mixture was heated further to 160° C., and the water of reaction was removed by azeotropic distillation with the xylene, phase separation and recycling of the xylene. The mixture was kept at 160° C. for three further hours until an acid number of less than 10 mg/g was measured on a sample taken from the reaction mixture. The xylene which remained was removed by distillation under reduced pressure. A resin having the following data resulted:

| | |
|---|---|
| mass fraction of solids: | 99.4% |
| Acid number: | 7 mg/g |

Example 5

Condensation Product of the Adduct ABC of Example 4 with a Grafted Fatty Acid of Example 3

643 g of the resin from Example 4 and 588 g of the resin from Example 3 were introduced into a reactor and heated to 190° C. The water of reaction formed during the esterification was distilled off azeotropically together with the xylene of the resin solution of Example 3; the xylene separated was recycled into the reaction mixture. The condensation was continued for approximately two hours until a Staudinger index of 7 cm$^3$/g was determined on a sample taken. The xylene which remained was subsequently distilled off under reduced pressure. A resin having the following data resulted:

| | |
|---|---|
| mass fraction of solids: | 99.3% |
| Acid number: | 62.5 mg/g |
| Staudinger index | 7.5 cm$^3$/g |

The reactor was then cooled and the contents were emulsified starting at a temperature of 95° C. by addition of aqueous ammonia solution (25 g of NH$_3$ in 100 g of the solution) and of 1,640 g of distilled water, under stirring. The following values were determined on the emulsion obtained:

| | |
|---|---|
| mass fraction of solids: | 40% |
| Acid number: | 68 mg/g |
| pH* | 8.15 |
| Dynamic viscosity (23° C., 10 s$^{-1}$): | 10 Pa · s |
| Average particle size | 36.5 nm |

*Measurement after dilution to a mass fraction of solids of 10% in aqueous solution Using this emulsion, a clear coat paint was formulated which, when brushed onto wood, yielded a glossy coating with good wood wetting.

Example 6

Condensation Product of the Resin of Example 4 with a Low Molar Mass Acid 643 g of the resin from Example 4 and 135 g of trimellitic anhydride were charged into a reactor and heated to 160° C. By addition of the anhydride and partial esterification, the Staudinger index (measured in chloroform at 23° C.) of samples taken rose to 8.5 cm$^3$/g in the course of two and a half hours. When this value was reached, the mixture was cooled and emulsified by addition of a mixture of 58 g of an aqueous ammonia solution (25 g of $NH_3$ in 100 g of the solution) and 1,310 g of distilled water, while stirring. The following values were determined on this resin emulsion:

| | |
|---|---|
| mass fraction of solids: | 36% |
| Acid number: | 88 mg/g |
| pH*  | 8.25 |
| Dynamic viscosity (23° C., 10 s$^{-1}$): | 7.55 mPa·s |
| Average particle size | 67 nm |

*Measurement as above

Using this emulsion, a clear coat paint could be formulated which, when brushed on to wood, gave a glossy coating with good wood wetting.

The invention claimed is:

1. Reaction products of
hydroxy-functional binder components containing a linear or branched main chain which has a polymethylene structure —$(CH_2)_n$— or a polyester structure or a structure derived from fatty acid esters of glycerol or other polyhydric alcohols, characterised in that they have cyclic imide structures grafted on to the main chain, the imide nitrogen atom carrying a hydroxyalkyl group or a hydroxyalkyl-aryl group as substituent, and
compounds selected from the group consisting of
compounds D' containing acid groups, wherein the reaction is an esterification reaction, and wherein water is removed, and wherein the reaction products contain at least one acid group per molecule, and of
compounds D" selected from the group consisting of compounds having at least one isocyanate group and one acid group, and of compounds having at least one isocyanate group and at least one olefinically unsaturated group, wherein the reaction is an addition reaction, and wherein the reaction products have a urethane, an urea, or a thiourea structure, and wherein the reaction products contain, per molecule, at least one acid group, or at least one olefinically unsaturated group.

2. The reaction products of claim 1 wherein the hydroxy-functional binder components are obtained by reaction of olefinically unsaturated substances A having at least one olefinic double bond and a molar mass of from 400 g/mol to 6,000 g/mol, olefinically unsaturated cyclic acid anhydrides B and hydroxyamines C having at least one primary amino group and at least one hydroxyl group, wherein the radicals of the acid anhydrides B are bonded to the compounds A by a carbon-carbon bond, and wherein the acid anhydride groups are converted into acid imide groups by reaction with the hydroxyamines C.

3. The reaction products of claim 2, wherein the olefinically unsaturated substances A are selected from the group consisting of oils, partially saponified or partially transesterified oils, low molar mass alkyd resins and oligomers or polymers of diolefins.

4. The reaction products of claim 2, wherein the olefinically unsaturated cyclic acid anhydrides B are intramolecular anhydrides of aliphatic and cycloaliphatic dicarboxylic acids having 4 to 16 carbon atoms and contain at least one olefinic double bond.

5. The reaction products of claim 2 wherein the hydroxyamines C are aromatic-aliphatic or aliphatic linear, branched or cyclic hydroxyamines having at least one hydroxyl groups and at least one primary amino group and at least two carbon atoms.

6. A process for the preparation of reaction products of hydroxy-functional binder components as claimed in claim 2, characterised in that
olefinically unsaturated substances A having at least one olefinic double bond and a molar mass of from 400 g/mol to 6,000 g/mol are reacted with
olefinically unsaturated cyclic acid anhydrides B to give an adduct linked via carbon-carbon bonds, which is reacted with
hydroxyamines C having at least one primary amino group and at least one hydroxyl group, with conversion of the acid anhydride groups into acid imide groups by reaction with the hydroxyamines C,
to form hydroxy-functional binder components, and subsequent reaction of the hydroxyl groups of the said hydroxy-functional binder components with compounds selected from the group consisting of
compounds D' containing acid groups, wherein the said subsequent reaction is an esterification reaction, and wherein water is removed, and wherein the reaction products contain at least one acid group per molecule, and of
compounds D" selected from the group consisting of compounds having at least one isocyanate group and one acid group, and of compounds having at least one isocyanate group and at least one olefinically unsaturated group, wherein the said subsequent reaction is an addition reaction, and wherein the reaction leads to formation of a urethane structure, a urea structure, or a thiourea structure, and wherein the reaction products contain, per molecule, at least one acid group or at least one olefinically unsaturated group.

7. The process of claim 6 wherein the reaction with the compounds D' is carried out by esterifying the hydroxy-functional binder components with compounds D' being selected from the group consisting of compounds D1, compounds D2, compounds D3, and compounds D4, under removal of water to form reaction products, the said reaction products containing at least one acid group per molecule, and wherein compounds D1 are polybasic acids having at least two acid groups, compounds D2 are fatty acids grafted with olefinically unsaturated acids, compounds D3 are oils grafted with olefinically unsaturated acids, and compounds D4 are polymers containing acid groups.

8. The process of claim 6 wherein in the reaction with the compounds D", the said compounds D" are selected from the group consisting of
compounds D5 having at least one isocyanate group and at least one acid group, which are adducts of polyfunctional isocyanates with compounds that contain at least one group which is reactive towards isocyanate groups, and at least one acid group, and
compounds D6 having at least one isocyanate group and at least one olefinically unsaturated group, which are adducts polyfunctional isocyanates and olefinically unsaturated compounds having hydroxyl groups,
wherein the reaction is an addition reaction, and wherein the reaction is carried out by formation of reaction products having a urethane structure, a urea structure or a thiourethane structure, the said reaction products containing either at least one acid group or at least one olefinically unsaturated group per molecule.

9. A process for the preparation of reaction products of hydroxy-functional binder components as claimed in claim 1, wherein
the said hydroxy-functional binder components contain a linear or branched main chain which has a polymethylene structure —$(CH_2)_n$— or a polyester structure or a structure derived from fatty acid esters of glycerol or other polyhydric alcohols, characterised in that they have cyclic imide structures grafted on to the main chain, the imide nitrogen atom carrying a hydroxyalkyl group or a hydroxyalkyl-aryl group as substituent, are reacted with compounds selected from the group consisting of compounds D' containing acid groups, wherein the reaction is an esterification reaction, and wherein water is removed and reaction products are formed, and wherein the said reaction products contain at least one acid group per molecule, and of compounds D" selected from the group consisting of compounds having at least one isocyanate group and one acid group, and of compounds having at least one isocyanate group and at least one olefinically unsaturated group, wherein the reaction leads to formation of reaction products having a urethane structure, a urea structure, or a thiourea structure, and wherein the said reaction products contain, per molecule, at least one acid group or at least one olefinically unsaturated group.

10. The process of claim 9 wherein the reaction with the compounds D' is carried out by esterifying the hydroxy-functional binder components with compounds D' being selected from the group consisting of compounds D1, compounds D2, compounds D3, and compounds D4, under removal of water and reaction products are formed, the said reaction products containing at least one acid group per molecule, and wherein compounds D1 are polybasic acids having at least two acid groups, compounds D2 are fatty acids grafted with olefinically unsaturated acids, compounds D3 are oils grafted with olefinically unsaturated acids, and compounds D4 are polymers containing acid groups.

11. The process of claim 9 wherein the reaction is an addition reaction, and wherein in the reaction with the compounds D", the said compounds D" are selected from the group consisting of compounds D5 having at least one isocyanate group and at least one acid group, which are adducts of polyfunctional isocyanates with compounds that contain at least one group which is reactive towards isocyanate groups, and at least one acid group, and compounds D6 having at least one isocyanate group and at least one olefinically unsaturated group, which are adducts polyfunctional isocyanates and olefinically unsaturated compounds having hydroxyl groups, and wherein the reaction is carried out by formation of reaction products having a urethane structure, a urea structure or a thiourethane structure, the said reaction products containing either at least one acid group or at least one olefinically unsaturated group per molecule.

* * * * *